(12) United States Patent
Brown et al.

(10) Patent No.: US 8,219,661 B2
(45) Date of Patent: *Jul. 10, 2012

(54) MILARRS SYSTEMS AND METHODS

(75) Inventors: Curtis D. Brown, Dove Canyon, CA (US); Nicholas J. Witchey, Laguna Hills, CA (US)

(73) Assignee: Lantronix, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,263

(22) Filed: Aug. 12, 2011

(65) Prior Publication Data

US 2012/0016925 A1    Jan. 19, 2012

Related U.S. Application Data

(60) Continuation of application No. 12/433,786, filed on Apr. 30, 2009, now Pat. No. 8,024,446, which is a division of application No. 11/031,643, filed on Jan. 7, 2005, now Pat. No. 7,698,405.

(51) Int. Cl.
    *G06F 15/173* (2006.01)

(52) U.S. Cl. ........ 709/223; 709/202; 709/224; 709/217; 709/253; 370/465

(58) Field of Classification Search .................. 709/217, 709/253, 202, 223, 224; 370/465
    See application file for complete search history.

(56) References Cited

U.S. PATENT DOCUMENTS

| | | | |
|---|---|---|---|
| 5,732,212 A * | 3/1998 | Perholtz et al. ............... | 709/224 |
| 5,954,797 A * | 9/1999 | Sidey ............................ | 709/223 |
| 6,085,243 A * | 7/2000 | Fletcher et al. ............... | 709/224 |
| 6,389,464 B1 * | 5/2002 | Krishnamurthy et al. .... | 709/220 |
| 6,633,905 B1 * | 10/2003 | Anderson et al. ............. | 709/219 |
| 6,681,232 B1 * | 1/2004 | Sistanizadeh et al. ......... | 1/1 |
| 6,881,096 B2 * | 4/2005 | Brown et al. ............ | 439/620.01 |
| 6,892,233 B1 * | 5/2005 | Christian et al. ............. | 709/223 |
| 6,925,335 B2 * | 8/2005 | May et al. ......................... | 700/9 |
| 6,996,827 B1 * | 2/2006 | McCloghrie et al. ......... | 719/318 |
| 7,197,562 B2 | 3/2007 | Murtha et al. | |
| 7,295,566 B1 * | 11/2007 | Chiu et al. .................... | 370/419 |
| 7,309,260 B2 | 12/2007 | Brower et al. | |
| 7,415,552 B2 * | 8/2008 | Chen .............................. | 710/73 |
| 7,822,816 B2 * | 10/2010 | Payne ........................... | 709/206 |
| 2001/0054161 A1 * | 12/2001 | Wooddruff ...................... | 714/27 |
| 2002/0035623 A1 | 3/2002 | Lawande et al. | |
| 2003/0018770 A1 * | 1/2003 | Bae ............................... | 709/223 |
| 2003/0149796 A1 * | 8/2003 | Emerson et al. ............... | 709/250 |
| 2003/0204377 A1 * | 10/2003 | Royal et al. ................... | 702/188 |
| 2003/0233450 A1 * | 12/2003 | Carley .......................... | 709/224 |
| 2004/0143470 A1 * | 7/2004 | Myrick et al. .................... | 705/7 |
| 2004/0148385 A1 * | 7/2004 | Srinivasan et al. ............ | 709/224 |
| 2005/0104852 A1 * | 5/2005 | Emerson et al. ............... | 345/157 |
| 2005/0114894 A1 * | 5/2005 | Hoerl .............................. | 725/74 |
| 2005/0125519 A1 * | 6/2005 | Yang et al. ..................... | 709/223 |
| 2005/0125523 A1 * | 6/2005 | Hickerson et al. ............ | 709/223 |
| 2005/0129035 A1 | 6/2005 | Saito | |
| 2005/0149238 A1 * | 7/2005 | Stefani et al. ................... | 701/33 |

(Continued)

*Primary Examiner* — Alina N. Boutah
(74) *Attorney, Agent, or Firm* — Fish & Associates, PC

(57) ABSTRACT

An add-on module provides extrinsic management functionality to legacy and other devices. Contemplated modules include: (a) a state agent that provides at least one of the MILARRS function, and (b) a product agent that communicates with the device using at least one serial interface. Implementations are contemplated for both legacy devices that natively provide less than complete MILARRS functionality, and newly developed devices for which the developer desires a ready-made implementation of MILARRS functionality.

23 Claims, 8 Drawing Sheets

U.S. PATENT DOCUMENTS

| | | |
|---|---|---|
| 2005/0181643 A1 | 8/2005 | Brower et al. |
| 2005/0193103 A1* | 9/2005 | Drabik .......................... 709/221 |
| 2005/0204032 A1* | 9/2005 | Mirza-Baig ................... 709/224 |
| 2005/0271079 A1 | 12/2005 | Teoh |
| 2006/0041655 A1* | 2/2006 | Holloway et al. ............. 709/223 |
| 2006/0041856 A1* | 2/2006 | Holloway et al. ............. 717/101 |
| 2006/0059456 A1* | 3/2006 | Baba ............................. 717/104 |
| 2006/0085516 A1* | 4/2006 | Farr et al. ...................... 709/217 |
| 2006/0156054 A1* | 7/2006 | Brown et al. ...................... 714/4 |
| 2006/0267936 A1* | 11/2006 | Hoerl et al. .................... 345/158 |
| 2007/0016664 A1* | 1/2007 | Ewing et al. .................. 709/223 |
| 2007/0192455 A1* | 8/2007 | Motoyama et al. ........... 709/223 |
| 2007/0206630 A1 | 9/2007 | Bird |

\* cited by examiner

MILARRS SYSTEMS AND METHODS

CROSS REFERENCES TO RELATED APPLICATION

This application is related to and claims priority from the U.S. patent application Ser. No. 12/433,786 filed on Apr. 30, 2009 and U.S. patent application Ser. No. 11/031,643 filed on Jan. 7, 2005.

FIELD OF THE INVENTION

The field of the invention is networked management of electronic devices.

Background

The number of network-connected devices has grown dramatically over the last decade. Such growth is expected to continue far into the future, causing enormous problems of integration for consumers, companies, and governments. One significant problem is the inclusion of many legacy devices that were never intended to be connected to a network. For instance, gaining information regarding bulb life on a projector can reduce down time by allowing a manger to replace the bulb before it burns out. But light bulbs and electrical systems that operate light bulbs are generally not designed to be networked.

Another problem is the ever-growing number of network enabled devices that have inadequate monitoring and control capabilities. These problems are pervasive, involving all manner of equipment from FAX machines, printers, copiers and other office equipment, to specialized devices found in manufacturing plants, to home appliances, and even handheld electronics such as cameras and audio/video players. This problem is particularly acute for IT administrators, who often find themselves spending a great deal of money and time bridging heterogeneous management systems. Most of these devices do not contain state information and are even more difficult to manage. A more homogeneous management environment can save time and money, but numerous vendors have many valid business and technical reasons for avoiding homogeneous management systems.

Device management functionality comes in many different forms depending on the administrator's needs and the capabilities of the target device. Common management functions include monitoring the device's critical information, taking an inventory of the devices sub-systems, logging interesting events that take place, sending alerts to an administrator, recovering the device if the power fails, ensuring the data is secure, asset tracking, or reporting information to an administrator. Administrators also employ more advanced management functions including scripting or programming, aggregating device data from multiple devices, diagnostics, taking action based on the device data content, trending device data, reporting information in a final format including a spreadsheet or graph, or translating from one management format to another. A major area of management functionality includes securing the device through providing confidentiality of data, data integrity, administrator authentication, device authentication, risk mitigation, countermeasures, or protection against hostile environments and threats.

Management functionality described above can be represented concisely by the acronym MILARRS. MILARRS has the following meaning:

Monitoring the state of the device for an administrator
Inventory the devices sub-systems, components, or assets
Logging data or events generated by the device
Alerting an administrator of device state or taking action based on defined rules
Recovering the device if it fails or shuts down
Reporting device information or diagnostics to an administrator
Securing the device and its assets from threats and risks IT departments are well aware of the management issues involved with network devices. They regularly manage large numbers of servers, printers, or file systems. Many IT shops employ Simple Network Management Protocol (SNMP) to manage devices through the use of application software including HP's OpenView. Over the last several years, Intel and other organizations (DELL and HP) have promoted new a standard called Intelligent Platform Management Interface (IPMI) for managing devices including servers, chassis, or racks. Other companies suggest using a common Data Center Markup Language (DCML) being developed under the OASIS Consortium or Web services for Management eXtensions (WMX) proposed by Microsoft for hardware management. These and other standards embody various management concepts or functions. Unfortunately, all these methods have limitations. In addition, these "standards" have created a chaotic environment where all the "standards" conflict, require different applications, or generally don't communicate with each other efficiently. Another consequence of all these standards is that device developers have difficulty knowing which method will be employed by their end customer but would like to offer their customers flexibility in selecting their preferred management environment.

Protocols including SNMP offer methods of transporting device information, but do not offer a method of actually performing management actions. In addition, data transport mechanisms including WMX or DCML define how a remote administrator makes requests of a device, but again don't offer real autonomous management ability. Data transport mechanisms all require that the target device understand the methodologies a priori in order for them to work. These data transport mechanisms can be used as part of an overall management strategy but do not offer a complete management solution by themselves. For instance, IPMI uses SNMP for sending alerts, but SNMP does not provide actual management capabilities.

Unfortunately, manageable devices that use IPMI or other management methods must have the method built into the devices a priori, or at least the devices must have an upgrade path to provide management capabilities. This requires the device developer to spend time and money to incorporate the necessary management capabilities or plan for them ahead of time. An upgrade path for the device may take the form of a PCI slot for a server management card or the form of a software management application which requires an extensible operating system. Adding management solutions including IPMI at design time to a device is an expensive undertaking because of the learning curve involved, the added expense to the BOM to support an IPMI subsystem, royalties on firmware, and the time to integrate, and then test. In addition, most devices have static operating systems that can not be upgraded in a modular fashion. Clearly, IPMI does not provide a quick method for incorporating management functionality into a general purpose device.

IPMI offers a solid management solution for specific kinds of devices including server, chassis, or blades, but has limited capabilities. IPMI offers the ability to monitor, inventory, log, alert, and recover a device, but requires that the device be IPMI-aware at some level. IPMI sub-systems are often integrated into the physical design of a server's mother board making it difficult to add advanced management functionality to the device. In addition, an IPMI upgrade card can not be adapted to a general purpose device. When IPMI cards are available, they generally use a parallel interface including a PCI bus. Unfortunately, most existing low-end products do not have such an expensive interface. IPMI does offer the administrator the ability to set minimal criteria for monitoring, inventory, logging, recovery, alerting, and some security, but does not allow the administrator to adjust the management module to understand a generic device's natural communication method, to generate device state based on the device information context, or to make autonomous decisions based on the administrator's desired rules.

Other approaches have been taken in the past to provide minimal generic management solutions for legacy devices including console servers or device servers. These types of products are designed to connect to legacy systems through serial interfaces then tunnel data directly from the device to a remote administrator. An administrator must connect to the device through a console server or a device server using an application on a workstation in order see the device information streaming from the device's serial port. In both these cases, while they have provided remote connectivity to devices, they do not provide a method for actually managing the devices or a method for determining device state.

Finally, network devices coupled with evolving standards, and the high cost of adding management capabilities, have created several problems that need to be addressed as the number of networked devices increases:

Administrators need a method to access device state in order to reduce cost of maintenance;
Administrators need a module to attach to devices to bring them into a homogenous management environment to reduce costs associated with many different management environments;
Administrators need a method that allows them to set rules for managing a device for more efficient operation; and
Developers need an apparatus to quickly and cost effectively add management functionality to a product design to improve time to market.

Having a method and apparatus for converting device data into management data for a homogenous management environment can reduce the costs to IT professionals because they will no longer be required to learn additional IT management methods or purchase expensive software packages to bridge management systems. In addition, developers will be able to incorporate management functionality into their designs quickly thereby improving time to market.

Heterogeneous network devices, coupled with evolving standards and the high cost to add management capabilities, have created several problems that need to be addressed as the number of networked devices increases. There is a consequent need for apparatus and methods by which legacy devices can be brought into a homogeneous management system based on desired standards, and there is also a need for a low cost solution by which management capabilities can be added to existing designs and/or to new product designs.

SUMMARY OF THE INVENTION

The present invention employs an add-on module to provide extrinsic MILARRS functionality to legacy and other devices. Contemplated modules include: (a) a state agent that provides at least one of the MILARRS functions, and (b) a product agent that communicates with the device using at least one serial interface. The apparatus and methods disclosed herein are of greatest interest for managing legacy devices that natively provide less than complete MILARRS functionality to an environment Implementations are, however, also contemplated for newly developed devices for which the developer desires a ready-made implementation of MILARRS functionality.

From another perspective, it can be said that embodiments of the inventive subject matter remotely manage a device through an environment interface, using methods that involve: (a) providing an add-on module that passes queries to the device and receives responses to the queries, at least in part through a serial interface; and (b) manipulating data within the responses in a manner that provides at least one of the MILARRS functionalities that is not native to the device.

Various objects, features, aspects and advantages of the present invention will become more apparent from the following detailed description of preferred embodiments of the invention, along with the accompanying drawing.

DETAILED DESCRIPTION

Figure 1:
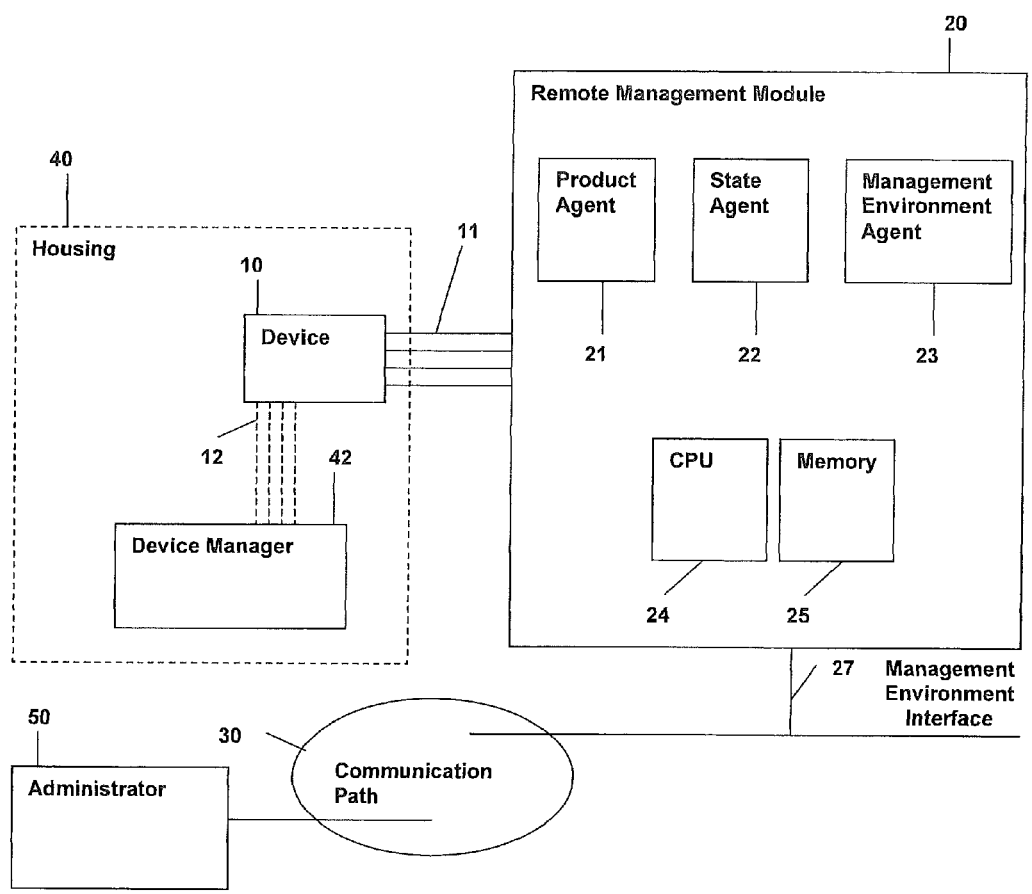
FIG. 1 is a schematic of a module according to the inventive subject matter, providing at least one non-native MILARRS function to a device through a serial interface.

In the very simple embodiment of FIG. 1, a device 10 has a serial interface 11 that communicates to a Remote Management Module (RMM) 20. The device 10 can also have a second management interface 12 and can also have a device manager 42, both of which are optionally included in a housing 40, where device 10 can communicate with device manager 42 using the second management interface 12. The RMM 20 includes a product agent 21, a state agent 22, and a management environment agent 23. The RMM 20 has an additional management environment interface 27 to provide remote connectivity for administrator 50 over communication path 30.

In most embodiments, the RMM 20 would provide management capabilities to the device 10 that the device 10 does not natively have available to it, either on-board on through the device manager 42. Alternatively or additionally, the RMM 20 may convert existing device management information into a different management format. The RMM 20 thus allows a remote person, software package, or other agent to manage the device 10 using a management scheme by providing MILARRS capabilities.

RMM 20 can be implemented in any combination of hardware, software and firmware. Typically, the RMM 20 contains a CPU 24 and a memory 25 for running software and physical interfaces for interacting with a device and the management environment.

Interfaces

The first physical interface (or set of interfaces) on the RMM 20 is designed for interacting with the target device. These interfaces can advantageously be implemented as serial interfaces (such as serial interface 11), and comprise a set of at least one data wire and/or additional wires for data or transmission and reception control (flow control).

Serial interfaces are defined herein to be interfaces having no more than 8 active, non-duplicate pins, including a ground. Preferred serial interfaces have no more than four such pins, and more preferred serial interfaces have no more than two such pins. In at least some implementations it is desirable for the interface to carry power to the device, examples include through power over Ethernet or power over serial.

All currently known serial interfaces are contemplated, as well as those that are developed in the future. Currently completed standards for such interfaces include, for example, I2C, SPI, CAN, Profibus, RS 232, RS 485, RS 422, USB, Ethernet, or even Gigabit Ethernet. Certainly, where a given module has multiple serial interfaces, those interfaces can be of different types (i.e., operate using different standards). Depending on the application, a contemplated serial interface could be built based on a set of general purpose programmable I/O (GPIO) pins. Such pins can be driven by software running on the RMM's CPU or the device's CPU implying the GPIO pins also provide a serial I/O interface. Since target devices for the module include legacy or other devices that operate relatively slowly, it is specifically contemplated that the serial interface will at some or all times carry data at no more than 19,200 bps.

Connection from serial port 11 to the RMM 20 can be accomplished in any desired manner, including hardwiring through phone lines, cables, connectors, soldering, or over the Internet.

The second physical interface 27 (or set of interfaces) of the RMM 20 is designed for interacting with the management environment. These interfaces generally provide network access and remote access to administrator 50. Typical management environment interfaces 27 are Ethernet, 802.11a/b/g, A™, or others. These interfaces are used to send data over packet switched networks including LANs, WANs, WLANs, or Internet. It is also contemplated RMM 20 may communicate with device 10 through device manager 42 through serial port 11 or even physical interface 27.

Additional interfaces (not shown) may be also present within or on the RMM 20 to provide user interfaces, control over the RMM 20 itself, power, or even a method to place security parameters within the RMM 20 via a trusted path.

Agents

The software running on the RMM 20 preferably consists of three main areas of functionality described as agents. Each agent represents a collection of software or firmware that focuses on a specific set of related tasks. The three agents are a product agent (PA) 21, a state agent (SA) 22, and a management environment agent (MEA) 23. The PA represents all the necessary software to allow the RMM 20 to communicate with the device and the SA. The SA represents the necessary software to communicate with the PA to establish any necessary state information for the device. The SA also handles all MILARRS related activities and communicates with the MEA. The MEA contains all the software necessary to allow the RMM 20 to communicate with the management environment and the SA. The agents represent logical separations of functionality. In alternative embodiments, the agents could be combined as necessary to realize a final product.

Other software or firmware above and beyond the agents described above may run on the RMM. The additional software may include an operating system, TCP/IP stack, FTP server, HTTP server, SNMP agent, file system, or other middleware. These items not only support the RMM 20 functionality but may be necessary for the management environment infrastructure, including providing an SNMP agent accessible by a remote administrator. Also, additional software offers general support for user interfaces or other module infrastructure.

Product Agent

The PA 21 communicates bi-directionally through a serial interface with the device. The method for communication depends on the nature of the actual physical interface. The PA must have an understanding of the native "protocol" of the target device in order to be able to communicate with the device. The protocol could be a collection of ASCII strings, binary data, or even states of GPIO pins. In addition to understanding the device's protocol, the PA will understand how to communicate with the SA using a set of internal APIs. As the PA facilitates communication between the device and SA, it will employ a set of rules to translate the device data into data the SA can understand. The PA may employ a number of different methods for performing the translation. For instance, a custom driver could be loaded in the RMM 20 that defines the device-to-SA translation rules. Or, a user could load an XML file that contains the necessary rules the PA must follow. Or, the PA could employ a scripting engine that allows a user to load a script containing the necessary translation rules. Or, the RRM could be implemented in a completely device specific manner and have all of the translation rules determined at manufacturing time.

Translation implies an active or passive interaction with the data where the data may be altered. Data could be passed through unaltered, deleted, converted from one format to another format, have additional data inserted, or just taken from one interface and placed on another interface.

State Agent

As currently contemplated, the state agent 22 can provide one, or any combination of the seven defined MILARRS functions. A given state agent can even be implemented to provide one set of MILARRS functions at one point in time or to one device, and another set of MILARRS functions at another point in time, or to another device. Some of the MILARRS functions are best implemented using a memory that is local to the state agent, and in such instances data can be stored in any suitable fashion, including storing the data using a standard file structure, or storing the data in a database structure. The state agent is preferably intelligent enough to interact with a data stream from the device via filtering, abstraction, data deletion, data insertion, alteration, or taking actions based on defined rules.

A given module would generally include only a single state agent, but may well include a plurality of product agents to facilitate communication with different devices. Each product agent can be integrated into the state agent, but more preferably can exist independently from the state agent so that different product agents can be readily added during manufacturing, or interchanged to communicate with different devices. Communication with devices can be entirely passive on the part of the product agent, or can be interactive, with the product agent querying one or more devices and receiving responses to the queries. The latter can be implemented on a strict one-to-one correspondence between a query and a response, but is more preferably implemented on some other basis.

The SA communicates bi-directionally with the PA and the MEA using an internal set of APIs and memory transfers. The main role the SA plays is handling all MILARRS functionality by accepting data from and communicating with the PA and MEA and storing and retrieving information from an internal database. The database contains the necessary state information for the device. The state information could include configuration items, time stamps, events, alert policies, inventory items, report information, trending, security and authentication information, monitoring data, logging data, or other state based information. The database is stored in a file system or other data storing structure.

The SA provides the main intelligence of the RMM. Because the SA handles all MILARRS functionality, it must make decisions based on the desires of the remote administrator as determined by communicating through the MEA. For instance, the SA may be required to periodically inspect a device value to determine if the device has exceeded a specified threshold. If the threshold has been exceeded the SA could then send an alert through the MEA to the remote administrator. In this sense, the SA also provides translation capabilities as well as providing the "action" nature of the RMM.

Management Environment Agent

Administrator 50 can communicate with the device directly or indirectly through a RMM 20. Administrators typically apply a set of rules to data emitted from a device, and thereby derive useful information that can then be used to monitor and control the device. All such administrators are contemplated, including those that will be developed in the future. Communication with the administrator can occur in any suitable manner, according to any suitable protocol or protocols. In current implementations, for example, the module can communicate with the administrator using a packet switched network protocol, either through wires or wirelessly. Especially contemplated protocols are TCP, UDP, SNMP, FTP, TFTP, SSL, SSH, HTTP, Telnet, or SMTP protocols. It is also contemplated that newer protocols can also be used as they gain currency. Depending on the implementation, it is also contemplated that a module can interoperate with at an established management protocol, examples of which include IPMI, SNMP, ALOM, DCML, and WMX.

It is contemplated that the product agent and an environment interface can each employ a different management methodology. It is also contemplated that a given environment interface can concurrently service the environment and at least one other environment.

The MEA communicates bi-directionally with the SA and the external management ecosystem. Consequently, it must have an understanding of the protocols and data formats required for the management environment. As the MEA interacts with management ecosystem, it translates the data and passes the data to and from the SA. In addition, as the SA needs to send data, such as an alert, to the management ecosystem, the message will be passed to the MEA who will translate it to proper protocol or data format. A typical format could include Intelligent Platform Management Interface developed by HP™, Intel™, and Dell™. Other formats could also be used including WMX, DCML, ALOM, or SNMP, Generally, these protocols and formats run over the packet switched network such utilizing TCP/IP or UDP/IP as a transport mechanism.

Security

A primary component of the MILARRS concept is security. Security represents fundamental concepts including authentication, confidentiality, integrity, managing threats to assets, mitigating risks to the system and device, or other concerns the administrator may have. The RMM 20 provides for user and message authentication to ensure the remote user has rights to the device data. Confidentiality is maintained by encrypting the data using cipher suites including DES, 3DES, AES, TwoFish, RC4, or other cipher suites. Data integrity can be maintained by ensuring all messages have appropriate checksums applied or digital signatures using an MD5, SHA-1, or other hash function. Authentication can be performed using any standard including those employed by SSL/TLS or SSH where RSA, DSA, and Diffie-Hellman (DH) are employed. SSL or SSH can be employed to provide secure interfaces to the device data. Beyond data security, the RMM 20 itself as a device can be secured by taking the RMM's cryptographic system through FIPS 140 validation and certification (or relevant validation since FIPS 140 is revised every five years; see http://csrc.nist.gov/cryptval/140-2.htm). This and all other referenced patents and applications are incorporated herein by reference in their entirety. Common threats to the assets of the device could include denial of service attacks or hacking attempts. RMM 20 protects the device by providing defenses against such attacks by employing firewall capabilities or other common defenses. RMM 20 mitigates risks to the device by offering a buffer to the environment. For instance, if RMM 20 provides power to the device, it can protect the device against power surges. All other protection and defense methods are contemplated. Security can also be provided by employing IPSec or VPN functionality in the RMM 20 thereby allowing the RMM 20 to exist in a logical management ecosystem that may share a physical network with other hosts.

Heterogeneous to Homogeneous Management Environments

Figure 2:
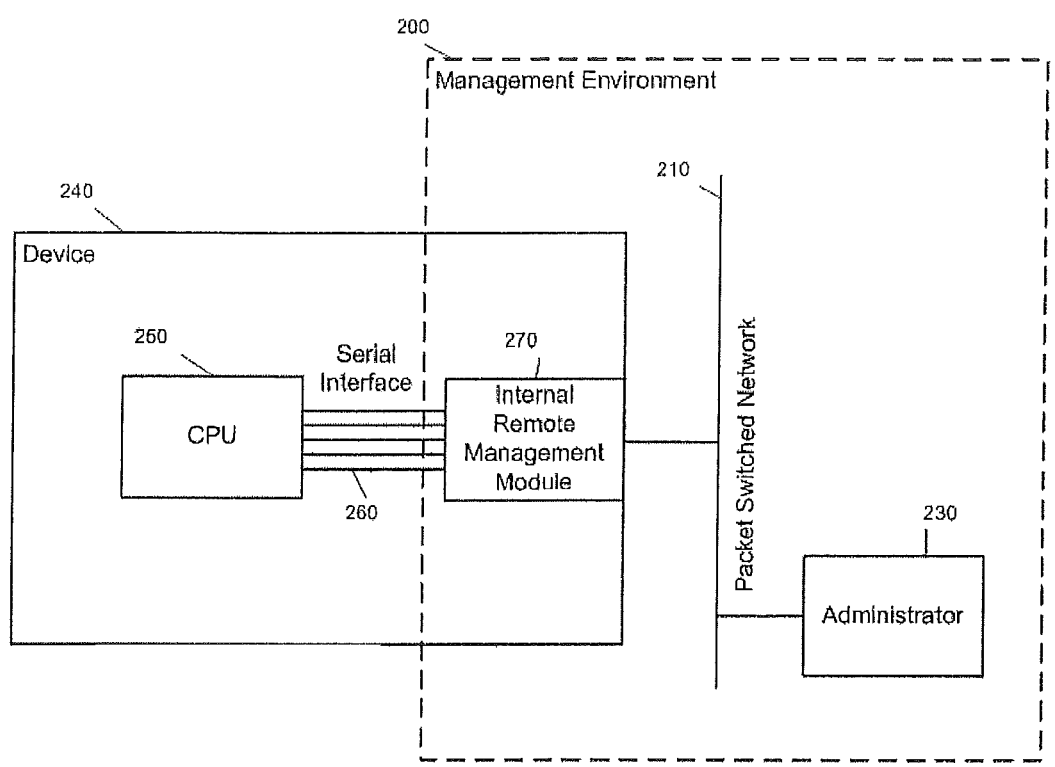
FIG. 2 is a representation of an internal remote management module integrated as an internal component of a device thereby allowing an administrator to manage the device within a management environment.

FIG. 2 represents management environment 200 where administrator 230 has a number of devices that require management and where the administrator would like to manage all of the devices using the same methodologies. Device 240 has limited or no MILARRS management functionality and makes the management environment heterogeneous. Device 240 includes a preferred internal RMM 270 which brings device 240 into a homogenous environment. The RMM 270 directly or indirectly connects to the core CPU 250 of the device so RMM 270 is able to communication with device 240 and gain access to device data. The administrator 230 communicates with RMM 270 over a packet switched network 210.

Figure 3:
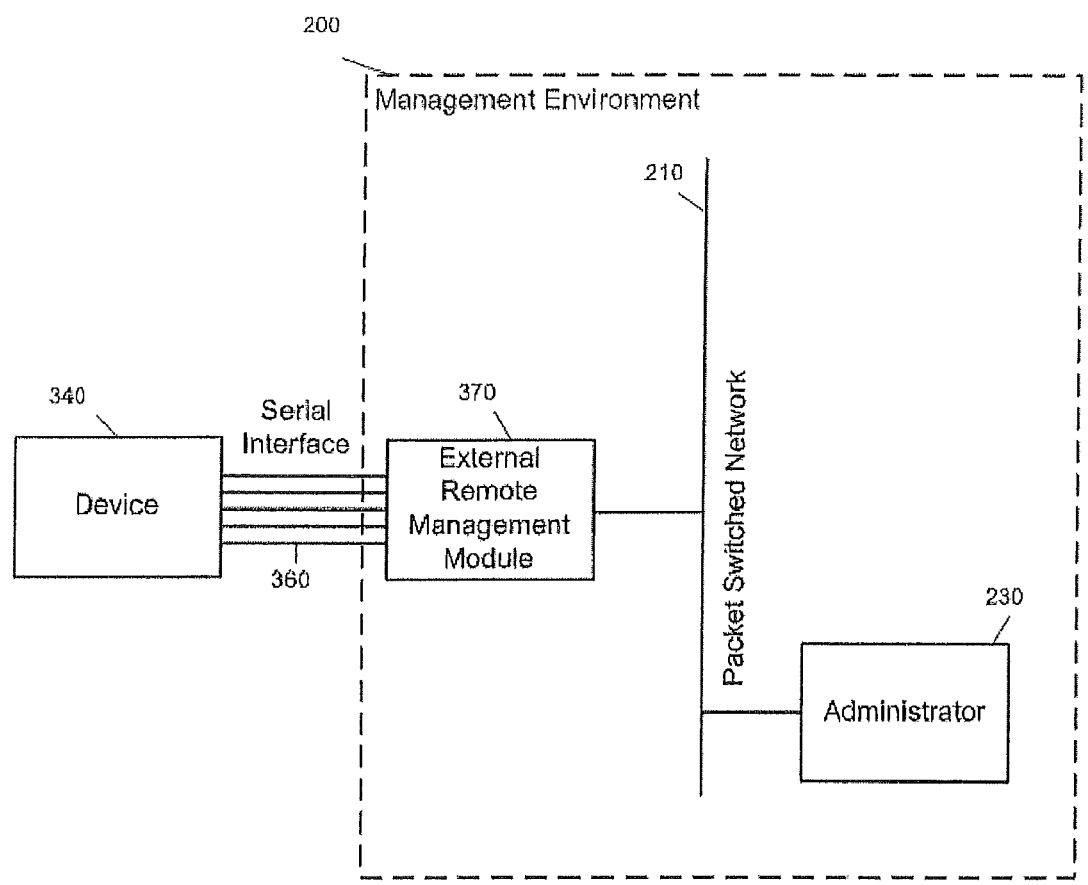
FIG. 3 is a representation of an external remote management module connected to a device thereby allowing an administrator to manage the device within a management environment.

FIG. 3 represents a similar management environment as FIG. 2, with the exception that RMM 370 is external to device 340. Device 340 has limited or no MILARRS management capability and thereby does not have the same management methodologies as management environment 200 consequently the management environment is heterogeneous. In this particular example, administrator 230 wishes to create a homogenous management environment by attaching a preferred external RMM 370 to device 340. RMM 370 attaches and communicates to the device via serial interface 360.

Two types of management environments exist where RMM 270 and 370 may be advantageously used. One type is a homogeneous environment where all devices are managed through the same methodology. In those embodiments, RMMs 270 and 370 provide management functionality to additional devices 240 and 340 in order for the devices to be part of the existing homogenous environment. The other type of environment is a heterogeneous environment where at least some of the connected devices are not part of the desired environment, or require different management methodologies. In those embodiments, RMMs 270 and 370 translate management information from devices 240 to 340 into management information that is homogenous with the environment used by the administrator.

Administrator 230 is responsible for managing all devices within management environment 200. Administrator 230 does not necessarily have to be a person, but could be a number of different functional entities. It is contemplated the administrator could be a software application that aggregates information including HP™ OpenView™, or a series of scripts written in various programming languages by IT professionals, or another management module. Administrator 230 connects to RMMs 270 and 370 using a communication mechanism designed for carrying management information over network 210. Commonly used communications mechanisms include IPMI, ALOM or SNMP designed for management using TCP/IP, UDP/IP or other network related protocols. Additional management information communication standards including DCML or WMX may also be employed. These communication mechanisms and their uses define management environment 200.

As embodied in the figures, packet switch network 210 supports the communication from managed devices, RMMs 270 and 370, and administrator 230. Preferably network 210 is based on Ethernet carrying TCP/IP or UDP/IP data. Other contemplated networks are also considered and include extended communications over the Internet, ATM, FrameRelay, fiber, or other physical layers. In addition, network 210 does not necessarily have to be wired, but could preferably be wireless supporting transports methods including WiFi or WiMAX or even Bluetooth or Zigbee. In the preferred embodiment, low level communication is done using a TCP/IP stack and related networking protocols. It is also contemplated that network 210 can extend beyond a single local network of devices and can be composed of a logical group of devices spread over the world using mechanisms including VPNs.

Device 240 and device 340 are characterized by having limited to no MILARRS management capabilities and do not seamlessly interact with management environment 200. In addition they are designed to communicate via serial interface 260 and 360 to other entities. Because of this communication, RMMs 270 and 370 are able to access device data and translate it to device information which can be used for management purposes. Example devices include servers, printers, projectors, medical devices, industrial control devices, access panels, gaming systems, or others. Serial interfaces 260 and 360 take on a large number of different configurations as required by the device based on bandwidth, data to be transmitted, or target communication parent. For devices similar to device 240 where internal communication is required, preferred serial interfaces include I2C, SPI, CAN, or Profibus. Additional internal serial interfaces could include RS-232, RS-485, or RS-422 if low bandwidth is enough or Ethernet or even USB if larger bandwidth is required. For devices similar to device 340 where external communication is expected, serial interfaces including RS-232, RS-485, or RS-422 are used. Depending on the nature of the device, Firewire, Ethernet or USB can also be used. Wireless links are also feasible for local device access, including Zigbee or Bluetooth. Additional information can be learned about devices 240 and 340 by including programmable I/O pin interfaces as part of the serial interface. Such pins can be used as additional data ports or used to determine device state information.

In one embodiment, devices 240 and 340 are management-unaware and do not offer any MILARRS capabilities to administrator 230 for management within the homogenous environment. For such devices, the RMMs offers MILARRS management functionality when they are intended to be stand-alone including a printer or a projector as well as collections of devices including servers where load balancing is required. As stated previously, if devices 240 and 340 are managementware, including devices already supporting IPMI or SNMP, the RMMs translate management information from the device to management information for the homogenous environment. A translation includes for instance, converting DCML information to WMX information or other format conversions.

RMMs 270 and 370 offer the same set of capabilities but represent different embodiments. RMM 270 represents an embedded component that can be purchased by a device manufacturer and placed within the product design to enable the device with management capabilities. Such a component is similar to the Lantronix™ XPort™ or Micro™ products. RMM 370 represents an external product similar to the Lantronix™ device server line of products including the UDS or the MSS products. In addition, RMM 370 can be a larger system that can mount in a rack for larger management systems including server farm management.

RMMs 270 and 370 provide MILARRS management functionality and non-management functionality. MILARRS management functionality is governed by a set of rules defined by the administrator or initial programmer of the module and includes supporting state-based information including status or alerts. In addition, non-state information including security or reporting are included. Additional management functionality can also be provided beyond state or non-state information including trending of states or device diagnostics. Non-management functionality represents items including web server, FTP server, operating system, or other infrastructure support to aid a device developer or support a device manager.

Remote Management Module Data Flow

Figure 4A:
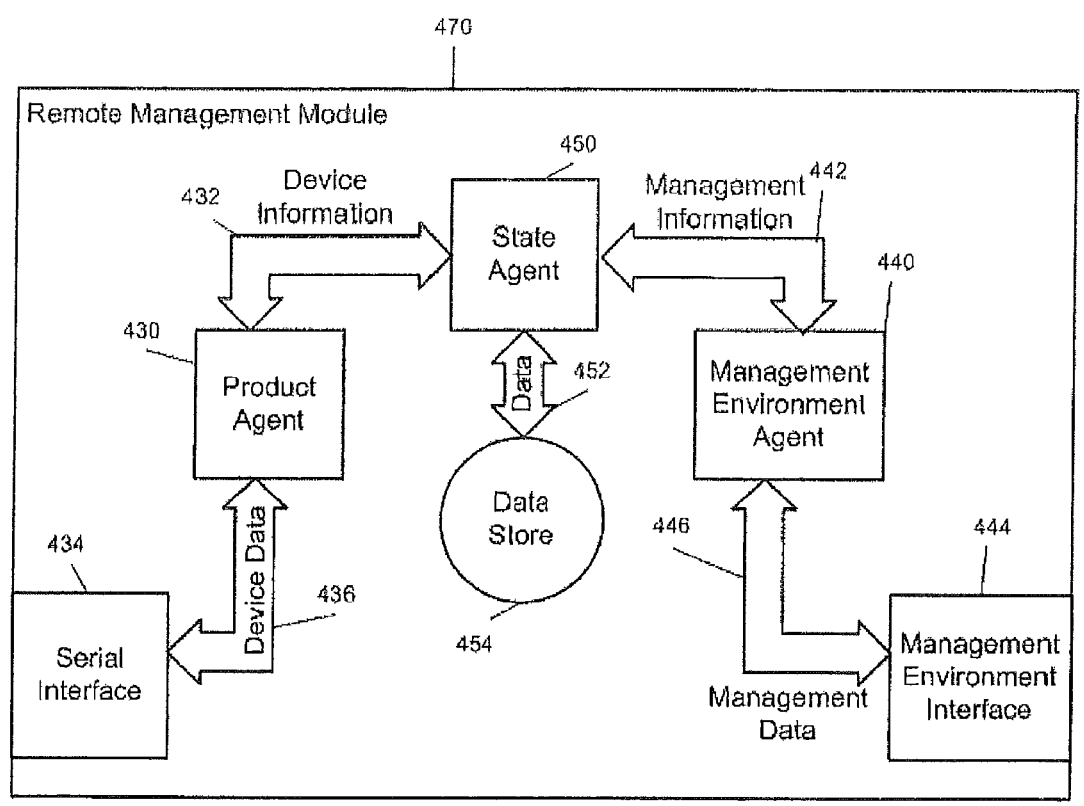
FIG. 4a is a graphical representation depicting the logical blocks and data flow for a remote management module managing a single device.
Figure 4B:
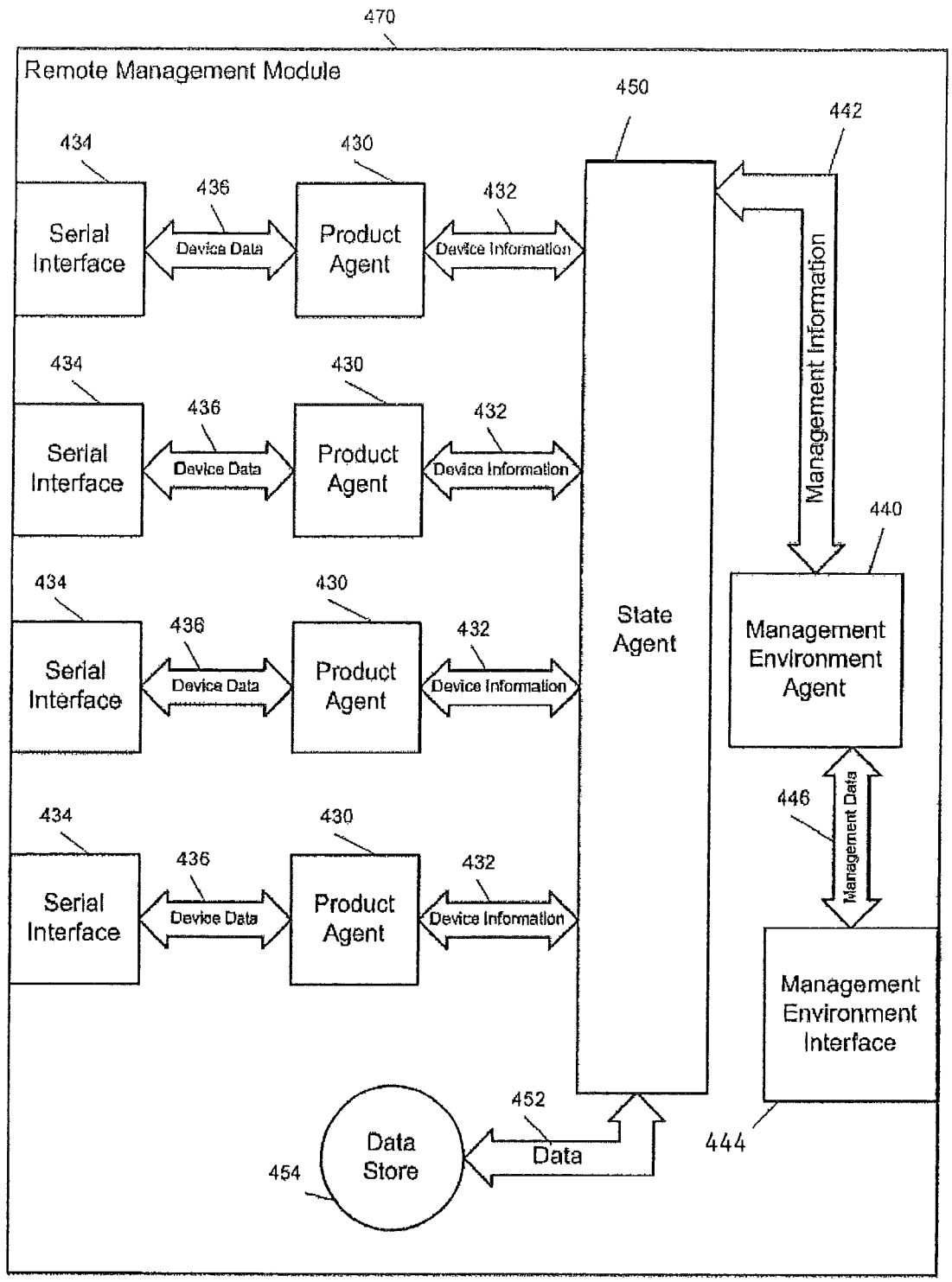
FIG. 4b is a graphical representation depicting the logical blocks and data flow for a remote management module managing multiple devices.

FIG. 4a displays the data flow through RMM 470 and further illustrates the interaction among the RMM's various agents. RMM 470 comprises several logical blocks of functionality and several main data exchanges. Serial interface 434 connects directly to a device and communicates in bi-direction with the device. As serial interface 434 accepts data from the device, interface 434 passes device data 436 to PA 430. In addition, PA 430 will pass device data 436 to serial interface 434. PA 430 translates device data 436 into device information 432 which is then passed to SA 450. Because RMM 470 is a bi-directional device, SA 450 also sends device information 432 to PA 430. SA 450 is responsible for translating device information 432 to management information 442 and back again. SA 450 communicates management information 442 with MEA 440. MEA 440 handles the translation of management information 442 into management data 446 if necessary. Finally, MEA 440 pass management information 446 to management environment interface 444 where the data is sent to the administrator. FIG. 4b also displays the data flow through remote management RMM 470 with the exception that RMM 470 can manage more than one device.

Serial interface 434 represents the hardware or firmware necessary to communicate at a low level with the target device as well to pass device data 436 to PA 430. Interface 434 removes any transport media dependencies. For environments where multiple devices must be managed including a server farm where each server has an RS-232 port, RMM 470 will require multiple RS-232 interfaces, one for each target device. Other contemplated serial interfaces may allow a single shared physical interface, yet have multiple firmware or software drivers to communicate to multiple devices. Examples of such an interface include an Ethernet interface.

For low bandwidth (less than 1Mbps) device communication requirements, internal and external serial interfaces include RS-232, RS-485, RS-422, I2C, SPI, CAN, Profibus, programmable I/O pins or Firewire. For high bandwidth (greater than or equal to 1Mbps) device communications requirements, serial interfaces include Ethernet, or USB. Non-data interfaces are also contemplated and include power, for example.

Device data 436 represents device specific data. The data could be command line interface information, status information, raw data streams, management data, or any other device specific data.

PA 430 has the responsibility for translating raw device data 436 into device information 432 and back again. Agent 430 employs a set of rules as defined by the manger during the translation process. Depending on the target management system, more than one PA 430 will be present within RMM 470 because the RMM can manage more than one target device. As the agent translates device data 436 into device information 432 data may be added, including a time stamp, or data may be removed including framing characters. In addition, data may be passed directly through agent 430 unaltered.

Device information 432 represents generic information about the device and is packaged in a manner for convenient communication with SA 450.

SA 450 represents the logical core and intelligence of RMM 470. SA 450 translates device information 432 into state information for the device, again according to rules defined by the administrator. State information comprises time based information including when the device powers-on, or non-time information including number of errors encountered by serial interface 434. As SA 450 collects device information 432 and management information 442, it builds an internal database used to represent the device to the administrator as well as used to represent the administrator's requests and queries to the device. SA 450 stores data 452 in data store 454 where data store 454 could be implemented in a number of ways including a file system, internal data structure, a database, or other data storing techniques. Beyond collecting and collating device information and responding to requests, SA 450 offers control of the device through the PA based on the rules defined by the administrator. The rules are part of the intelligence of SA 450 and offer RMM 470 the capability of deciding what signal and when to generate signals based on device information. Contemplated interactions include instructing the device to power down, configuring the device, sending complex instructions and commands, or other device specific actions. In this way, RMM 470 autonomously manages the device.

Management information 442 represents the packaged messages passed between SA 450 and MEA 440 in a manner convenient for internal communication.

MEA 440 translates management information 442 to management data 446 and back again. Translation involves ensuring the management data adheres to the target management environment format. Consequently, MEA 440 communicates with management environment interface 444. Of course the communication is bi-directional.

Management data 446 represents packaged requests, queries, configuration, or other management information. Data 446 is packaged in an internal format that facilitates communication with SA 450.

Management environment interface 444 has the responsibility for interoperating with the management environment. Interface 340 comprises firmware, or hardware to handle the necessary communication with the physical environment. As interface 444 interacts with the environment it converts the environment data into management data 446 by removing all media dependencies.

Remote Management Module Platform

Figure 5:
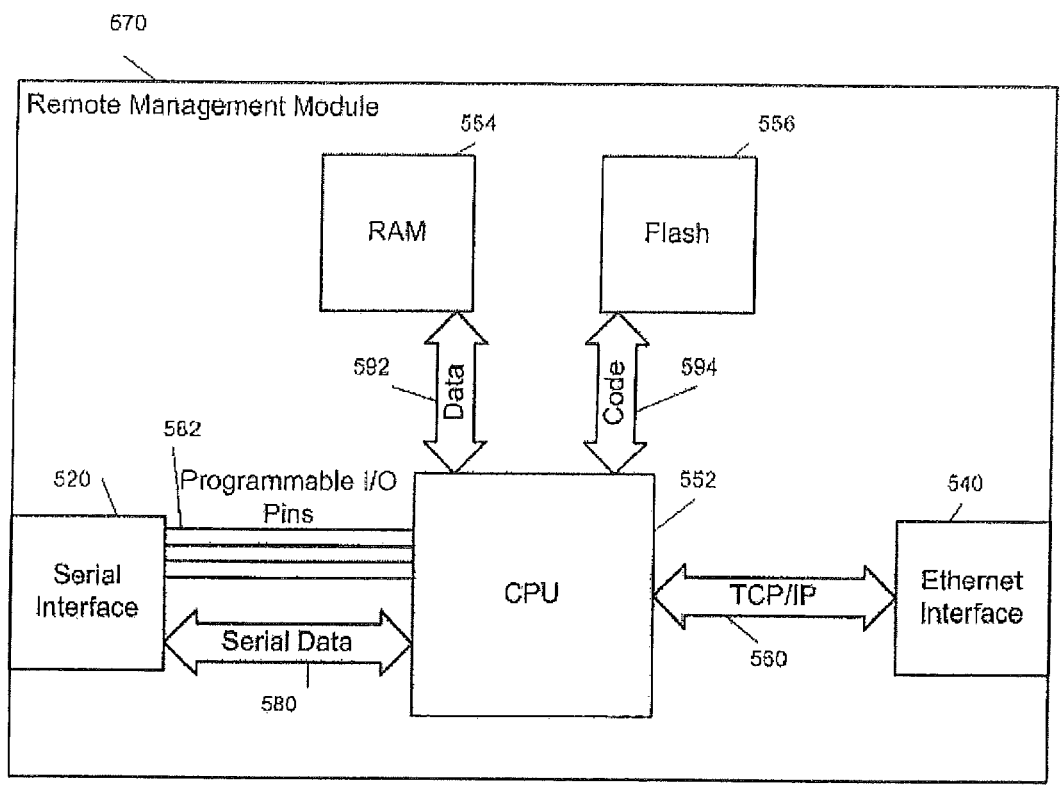
FIG. 5 is a representation of a physical construction of a remote management module.

FIG. 5 displays a block diagram representing a preferred platform of the RMM. The RMM has housing 570 encasing serial interface 520, CPU 552, RAM 554, non-volatile storage 556, and Ethernet interface 540. In addition housing 570 also encloses necessary buses and communication lines between the various components. Even though FIG. 5 shows an embodiment, other possible configurations are contemplated. For instance, the RAM and non-volatile storage could be combined with CPU 552 into a single chip solution. The RMM platform includes all the software, firmware, hardware, interfaces, or necessary components to enable the RMM to function with devices and a management environment. Other contemplated platforms for the RMM include sufficient components to enable managing multiple devices requiring multiple physical interfaces.

Serial interface 520 provides connectivity to the device and passes serial data 580 to CPU 552. In addition, serial interface 520 provides access to programmable I/O pins 582 from the device to CPU 552. CPU 552 runs the necessary software or firmware to control the RMM and stores data in RAM 554. The code that executes on CPU 552 is stored in non-volatile memory 556 which can be flash, EEPROM, even a hard drive. Ethernet interface 540 connects CPU 552 to the management environment and provides a path for TCP/IP data 560.

A number of configurations are contemplated for RMM 570, which can range from small embedded processors containing the complete logical functionality shown in FIG. 5 to full size rack mount computer systems. The RMM also includes firmware infrastructure to support the RMMs application. Firmware includes TCP/IP stack, operating system, file system, web servers, FTP servers, and other networking protocols. Beyond management, the RMM also supports configuration for itself as well as configuration for the device.

The physical nature of the platform supports the running of software or firmware for the RMM to supply the logical functionality depicted in FIG. 4a and FIG. 4b. A preferred embodiment will separate each of the logical blocks into functional units that communicate together. Other embodiments include combining all functional elements into a single monolithic executable image, or separating the logical elements into smaller parts. Yet other embodiments may include all necessary rules and firmware drivers placed into the RMM at manufacturing time for a specific set of devices and management environment.

Implementations

Currently, the most preferred embodiment of the RMM 570 is a small compact device that can be integrated easily into a device's product design, similar in its size and modularity to the Lantronix™ XPort™. Such an implementation would allow for both management of legacy devices, and inclusion into newly developed devices.

The RMM 570 can be embodied in a number of physical forms depending on the target application. A single chip or ASIC could be constructed to house the necessary CPU, memory, and physical interfaces to accomplish the MILARRS functions. A software developer's kit would provide all the necessary software components to support the chip. Another embodiment could be a small single board computer that can be integrated into a larger product similar to the Lantronix Micro product. Yet another embodiment could include all the RMM 570 functionality into an Ethernet RJ-45 jack similar to the Lantronix XPort. Yet another embodiment could be an external box level product that could be attached to the device similar to the Lantronix line of device servers. Depending on the configuration of the RMM, it could supply and/or receive power from its physical interfaces using power over Ethernet.

Remote Management Module Methods

Figure 6:
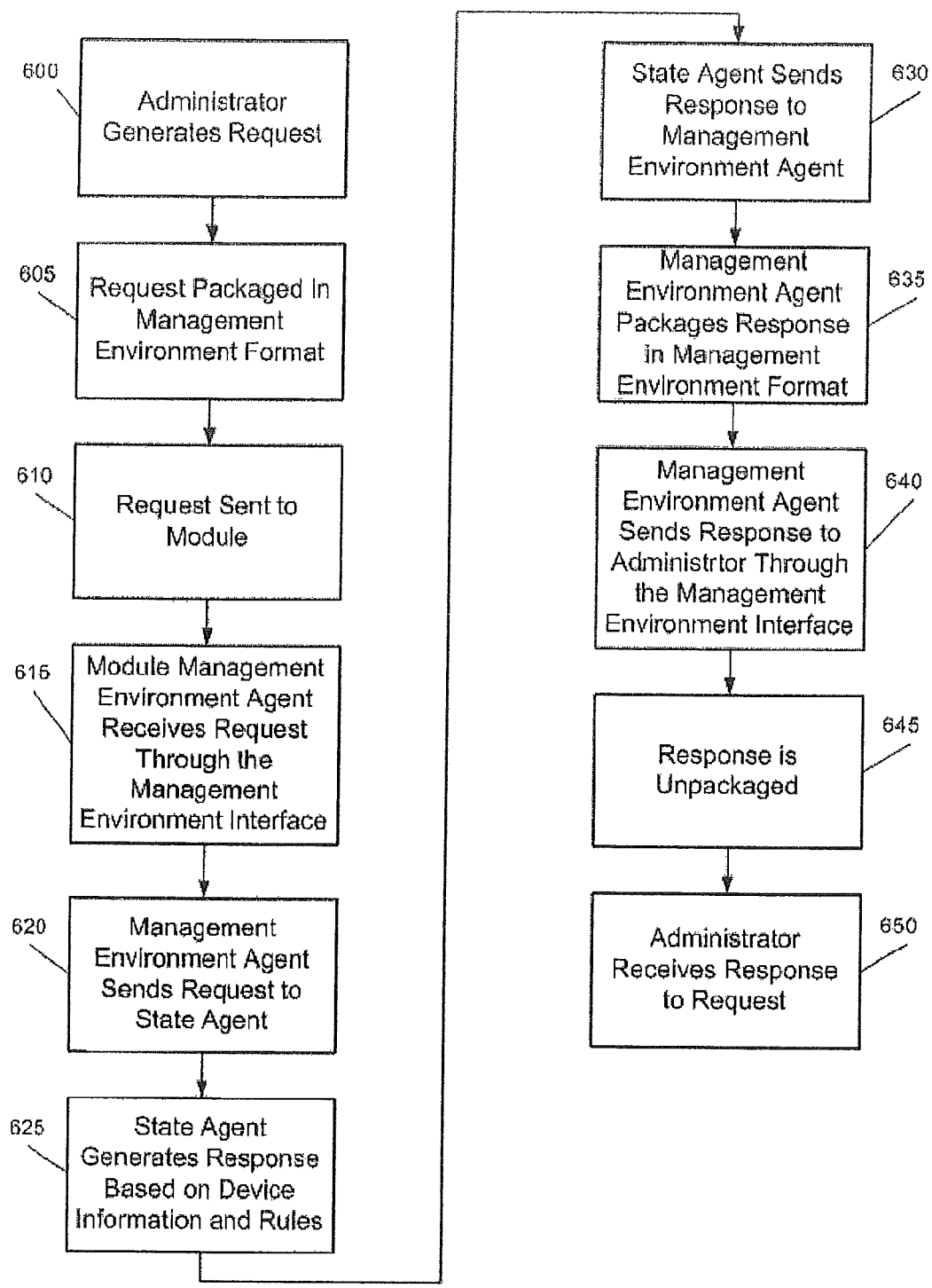
FIG. 6 is a representation of a method used by an administrator to interact with a remote management module.

FIG. 6 illustrates a preferred method for an administrator to interact with an RMM.

Beginning at step 600 an administrator generates a request of the RMM. The administrator's requests are characterized as being passive or active. The administrator sends passive requests to the RMM and expects a response at some later time based on the rules placed in the RMM, or the administrator expects the RMM not to respond at all. Requests that require a delayed response include configuring alerts, asynchronous device queries, events, requesting a report periodically, or setting up the RMM's rules systems in the SA or PA agent. Requests that don't require a response include configuring the RMM, sending commands through the RMM directly to the device, or toggling power. The administrator sends an active request to the RMM and expects a quick response to the request. Requests that require a quick response include queries that the device is alive similar to an ICMP ping, confirmation of login attempt, or a query of device state which could include bulb-hours for a projector. It is also contemplated other types or requests may be made of the RMM and include using FTP to send and receive data from the RMM or accessing web pages on the RMM using HTTP.

Step 605 depicts the packaging of the request into a format for the management environment. Generally, the administrator has a preferred management environment format which could include IPMI, SNMP, DCML, or WMX. Once the request has been packaged into the management environment format, at Step 610 the request is sent to the RMM over a packet switched network. Even though the request has been formatted into a management environment format, the final packets that are sent over the network may require different formatting or framing based on networking protocols and the actual transport media.

At Step 615 the management environment agent accepts the request through the management environment interface. The interface understands the networking infrastructure so it is able to pull the packet off the media then render the packet back into its desired format for use by the agent. The management environment agent has an understanding of the management environment format so it is able to translate the request into management data that can be processed by the RMM's MEA. The translation of the request includes passing the request through without modification or passing the request through with modification.

Step 620 shows the management environment agent passing the request to the state agent. A number of different possible methods may be employed to pass the request as determined by the scope of the functionality placed in the RMM, the RMM's design goals, or the needs of the target device. The methods used to pass the request include a direct memory copy through shared memory, passing a data structure or a pointer to a data structure, through a file on a file system, or through a socket descriptor.

At Step 625 the state agent within the RMM receives and processes the request. While the RMM is running, the management engine is interacting with the device through the product agent and serial interface, building up a collection of information regarding the device and the device state. Based on this information and the rules defined by the administrator that have been deployed to the RMM, the administrator determines the appropriate action to take regarding the request. Many possible actions are contemplated and include immediately responding, creating a delayed response, updating rules, passing a query to the device, or many others. Generally, the engine will form a response, possibly after a long delay, package the response and pass it back to the management environment agent as illustrated in Step 630.

Step 635 shows the reciprocal process of Step 615. The management environment agent takes the response from the state agent and packages the response in the management environment format. Once packaged, the response is sent by the management interface back to the administrator over the packet switched network at Step 640.

At Step 645 the response is unpackaged by the system used by the administrator and presented to the administrator. Once the administrator has the response, an informed decision regarding how to manage the device is made.

Multiple Modules and Administrators

Figure 7:
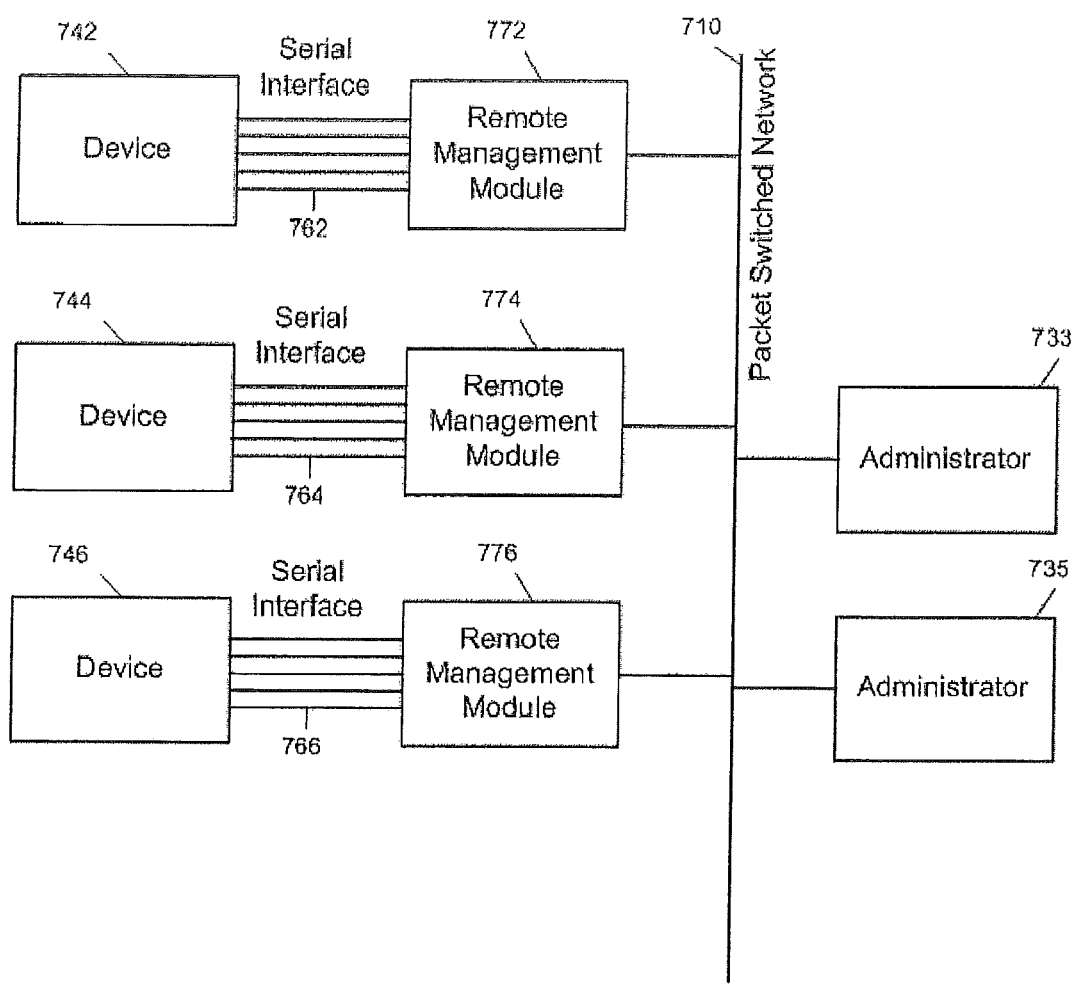
FIG. 7 is a representation of multiple administrators managing devices using multiple remote management modules.

FIG. 7 illustrates a contemplated management configuration where multiple devices 742, 744, and 746 are managed via remote management modules 772, 774, and 776 over serial interfaces 762, 764, and 766 respectively. Administrators 733 and 735 are responsible for shared management of all the devices over the packet switched network 710. Even though FIG. 7 depicts three devices, three modules, and two administrators, in reality the number of devices, modules, and administrators can vary.

It is contemplated that a single remote management module such as RMM 772 is capable of communicating with multiple administrators 733 and 735. Administrators 733 and 735 may share full responsibility for managing device 742. In addition, administrators 733 and 735 may split MILARRS responsibilities between them. For instance, administrator 733 may be responsible for monitoring, inventory, and alerting while administrator 735 may be responsible for reporting and security. It is contemplated that any number of administrators may share any combinations of MILARRS responsibilities over an RMM.

It is further contemplated that multiple RMMs such as those depicted by RMMs 772, 744, and 746 may communicate to many administrators 733 and 735. Just as in the single RMM case, administrators may share MILARRS responsibilities across many modules. Administrator 733 may be responsible for monitoring on all RMMs, and inventory on only RMM 774 while administrator 735 may be responsible for alerting on all RMMs, but only recovery on RMM 772 and 776. It is contemplated that any number of administrators may share MILARRS responsibility across any number of RMMs.

Thus, specific embodiments and applications of remote management modules have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A device management system comprising:
   at least one device lacking a management functionality; and
   an add-on hardware management module communicatively coupled with the device and configured to:
   pass a query to the at least one device;
   receive a response to the query from the at least one device; and
   provide the management functionality that is non-native for the at least one device by translating or manipulating data in the response into management information for the management functionality, where the non-native management functionality includes at least one MILARRS management functionality.

2. The system of claim 1, wherein the add-on management module comprises at least one serial interface through which the add-on management module couples with the device.

3. The system of claim 2, wherein the at least one serial interface comprises a low-bandwidth interface.

4. The system of claim 3, wherein the low-bandwidth interface comprises at least one of the following interfaces: an RS-232 interface, an RS-485 interface, an RS-422 interface, an I2C interface, an SPI interface, a CAN interface, a Firewire interface, and a Profibus interface.

5. The system of claim 2, wherein the at least one serial interface comprises a high-bandwidth interface.

6. The system of claim 5, wherein the high-bandwidth interface comprises at least one of the following: an Ethernet interface, a Universal Serial Bus interface, and a wireless interface.

7. The system of claim 1, wherein the at least one device comprises a medical device.

8. The system of claim 1, wherein the at least one device comprises an industrial control device.

9. The system of claim 1, wherein the at least one device comprises a gaming system.

10. The system of claim 1, wherein the at least one device comprises a printer.

11. The system of claim 1, wherein the at least one device comprises a projector.

12. The system of claim 1, wherein the at least one device comprises a server.

13. The system of claim 1, wherein the at least one device comprises an access panel.

14. The system of claim 1, wherein the at least one device comprises an appliance.

15. The system of claim 1, wherein the add-on hardware management module is further configured to generate the query in response to a administrator management request.

16. The system of claim 15, wherein the administrator management request comprises an active request expecting a quick response from the add-on hardware management module.

17. The system of claim 15, wherein the administrator management request comprises a passive request expecting a delayed response from the add-on hardware management module.

18. The system of claim 1, wherein the add-on management module comprises an internal add-on management module disposed within the device.

19. The system of claim 18, wherein the add-on management module comprises an Ethernet jack.

20. The system of claim 18, wherein the add-on management module comprises a chip.

21. The system of claim 1, wherein the add-on management module comprises an external add-on module disposed external to the device.

22. The system of claim 21, wherein the external add-on module comprises a device server.

23. The system of claim 21, wherein the external add-on module comprises a rack mount device.

* * * * *